United States Patent
Klement et al.

(10) Patent No.: US 11,702,323 B2
(45) Date of Patent: Jul. 18, 2023

(54) AUTOMATICALLY GUIDED LIFTING GANTRY DEVICE FOR CONTAINERS AND METHOD FOR OPERATING SUCH A LIFTING GANTRY DEVICE

(71) Applicant: Konecranes Global Corporation, Hyvinkää (FI)

(72) Inventors: Stefan Klement, Rimpar (DE); Daniel Baselt, Korschenbroich (DE); Sascha Pollak von Emhofen, Frechen (DE)

(73) Assignee: KONECRANES GLOBAL CORPORATION, Hyvinkää (FI)

( * ) Notice: Subject to any disclaimer, the term of this patent is extended or adjusted under 35 U.S.C. 154(b) by 638 days.

(21) Appl. No.: 16/620,147

(22) PCT Filed: Jun. 1, 2018

(86) PCT No.: PCT/EP2018/064508
§ 371 (c)(1),
(2) Date: Dec. 6, 2019

(87) PCT Pub. No.: WO2018/224408
PCT Pub. Date: Dec. 13, 2018

(65) Prior Publication Data
US 2021/0147192 A1  May 20, 2021

(30) Foreign Application Priority Data
Jun. 8, 2017 (DE) ...................... 10 2017 112 661.9

(51) Int. Cl.
*B66C 13/46* (2006.01)
*B66C 19/00* (2006.01)
(Continued)

(52) U.S. Cl.
CPC ............ *B66C 13/46* (2013.01); *B66C 19/007* (2013.01); *G01C 21/3647* (2013.01);
(Continued)

(58) Field of Classification Search
CPC ... B66C 13/46; B66C 19/007; G01C 21/3647; G05D 1/0246; G05D 2201/0205; B60R 2300/105
See application file for complete search history.

(56) References Cited

U.S. PATENT DOCUMENTS 6,081,292 A    6/2000  Lanigan, Jr. et al.
9,043,069 B1 *  5/2015  Ferguson ............... B60W 30/00
                                                    701/23
(Continued)

FOREIGN PATENT DOCUMENTS

CN       1338421 A    3/2002
CN    101573286 A    11/2009
(Continued)

OTHER PUBLICATIONS

Preliminary Report on Patentability of the International Searching Authority in English from corresponding Patent Cooperation Treaty (PCT) Application No. PCT/EP2018/064508, dated Aug. 6, 2019.
(Continued)

*Primary Examiner* — Donald J Wallace
(74) *Attorney, Agent, or Firm* — Gardner, Linn, Burkhart & Ondersma

(57) ABSTRACT

A lifting gantry device for containers, in particular of the straddle carrier or sprinter carrier type, having four gantry supports spaced apart from one another and which by wheels of the lifting gantry device is floor-based and freely movable. A vehicle controller is provided such that the lifting gantry device can be controlled automatically. A sensor system is also provided and configured to determine sensor data on the surroundings of the lifting gantry device for automatically controlling the lifting gantry device. The sensor system comprises at least two, preferably four, sensor units for contactless object measurement and in particular object recognition, of which one sensor unit each is arranged
(Continued)

on one of the four gantry supports and is configured to determine sensor data on the surroundings of the lifting gantry device for object measurement and in particular object recognition.

19 Claims, 6 Drawing Sheets

(51) Int. Cl.
*G05D 1/02* (2020.01)
*G01C 21/36* (2006.01)
(52) U.S. Cl.
CPC ...... *G05D 1/0246* (2013.01); *B60R 2300/105* (2013.01); *G05D 2201/0205* (2013.01)

(56) References Cited

U.S. PATENT DOCUMENTS

| | | | |
|---|---|---|---|
| 2009/0129904 A1 | 5/2009 | Bauer | |
| 2009/0179773 A1* | 7/2009 | Denny | G06T 7/80 340/901 |
| 2015/0307330 A1 | 10/2015 | Suzuki et al. | |
| 2015/0360918 A1* | 12/2015 | Ko | B66C 13/22 191/10 |
| 2016/0167932 A1* | 6/2016 | Holmberg | G06K 9/6215 382/104 |
| 2016/0332848 A1* | 11/2016 | Wieschemann | B66C 13/48 |
| 2021/0206605 A1* | 7/2021 | Rotem | B66C 23/022 |

FOREIGN PATENT DOCUMENTS

| | | |
|---|---|---|
| CN | 201793325 U | 4/2011 |
| CN | 203976241 U | 12/2014 |
| CN | 104781180 A | 7/2015 |
| CN | 104843583 A | 8/2015 |
| CN | 104860203 A | 8/2015 |
| CN | 104918876 A | 9/2015 |
| CN | 204823646 U | 12/2015 |
| DE | 102006044187 A1 | 4/2008 |
| DE | 102007046287 A1 | 4/2009 |
| DE | 102007060856 A1 | 7/2009 |
| DE | 102015117417 A1 | 4/2017 |
| EP | 1367022 A2 | 12/2003 |
| EP | 1490286 B1 | 12/2006 |
| EP | 1748335 A2 | 1/2007 |
| EP | 2060472 A2 | 5/2009 |
| EP | 2352690 B1 | 8/2013 |
| EP | 2574587 B1 | 6/2014 |
| EP | 2974992 A1 | 1/2016 |
| EP | 3000762 B1 | 3/2017 |
| WO | WO-2015110539 A1 * | 7/2015 ............. B66C 13/18 |

OTHER PUBLICATIONS

International Search Report and Written Opinion of the International Searching Authority from corresponding Patent Cooperation Treaty (PCT) Application No. PCT/EP2018/064508, dated Aug. 30, 2018.
International Preliminary Examination Report from corresponding Patent Cooperation Treaty (PCT) Application No. PCT/EP2018/064508 dated Aug. 6, 2019.

* cited by examiner

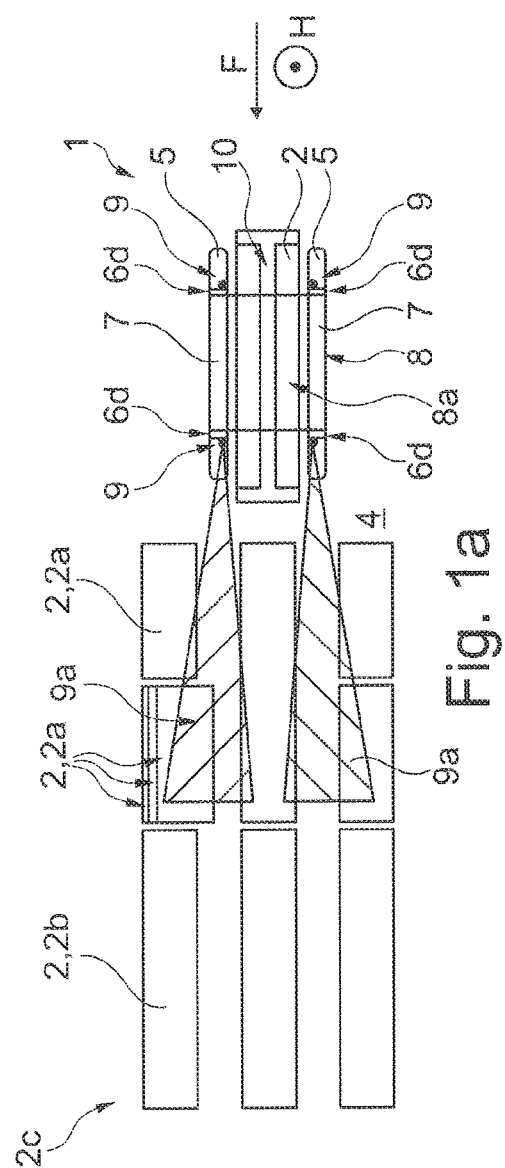
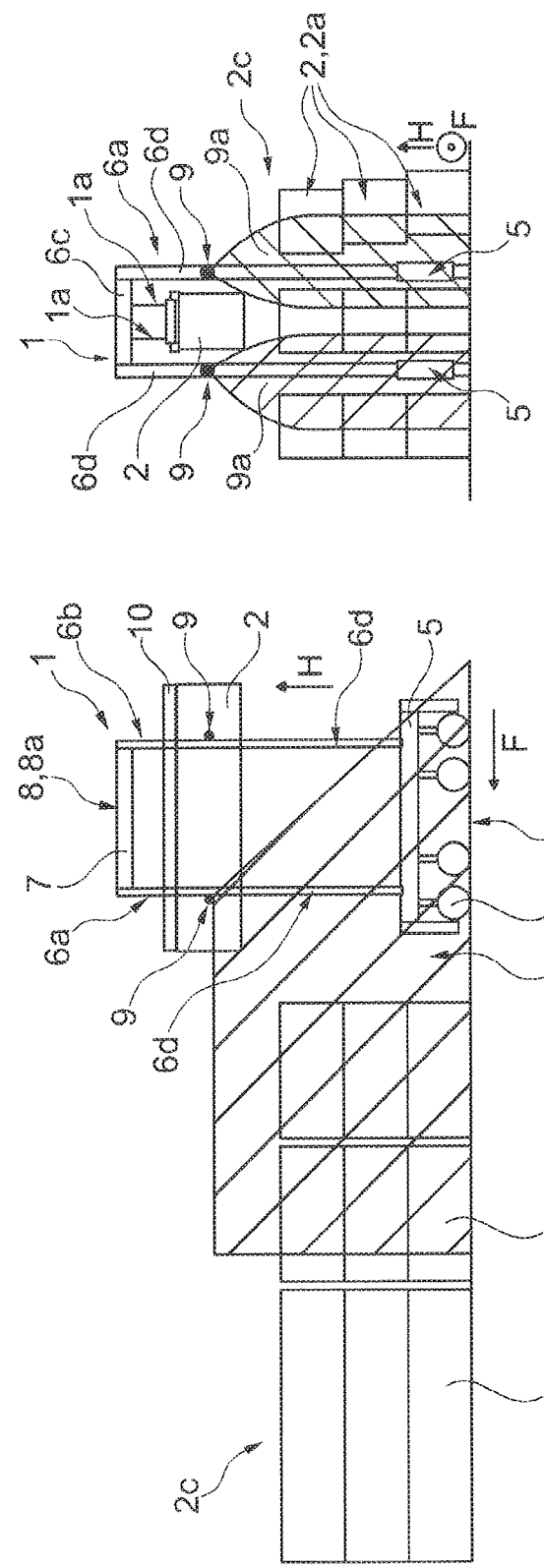
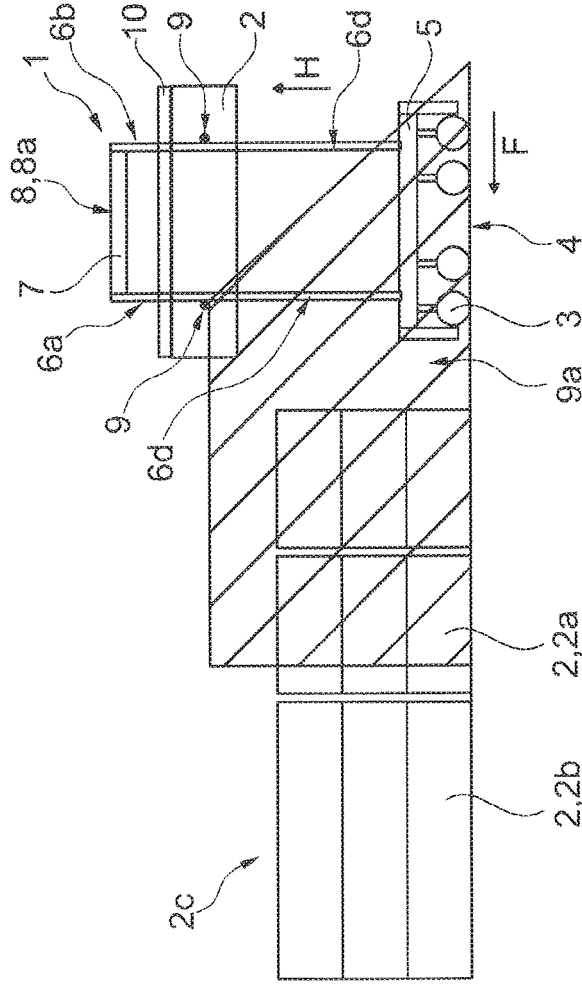

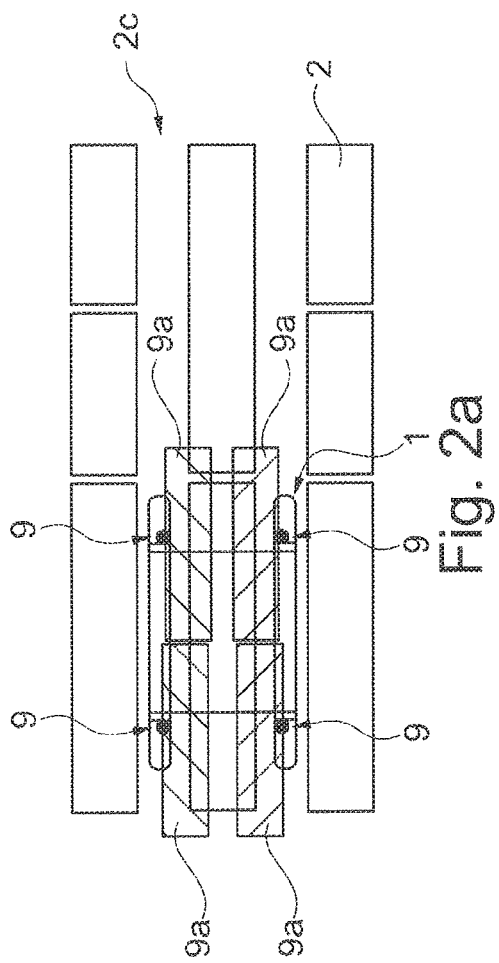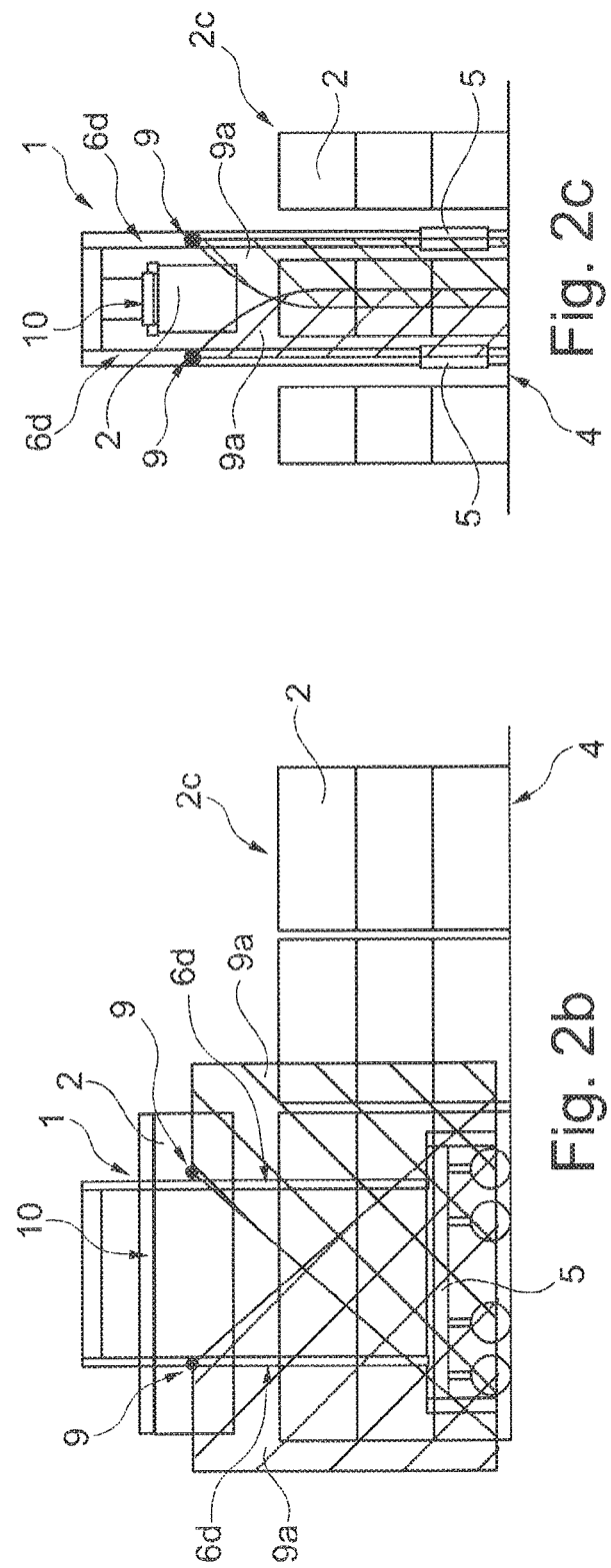

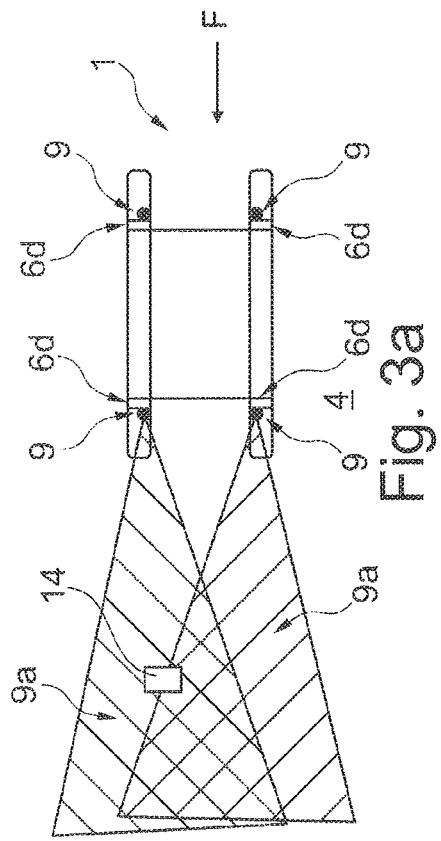
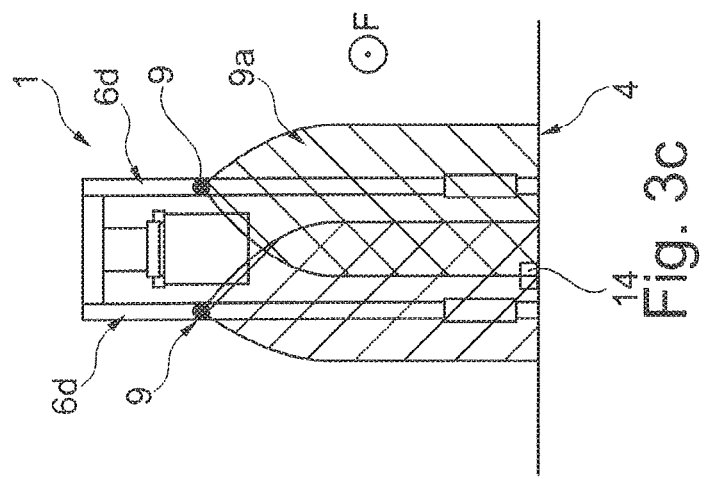
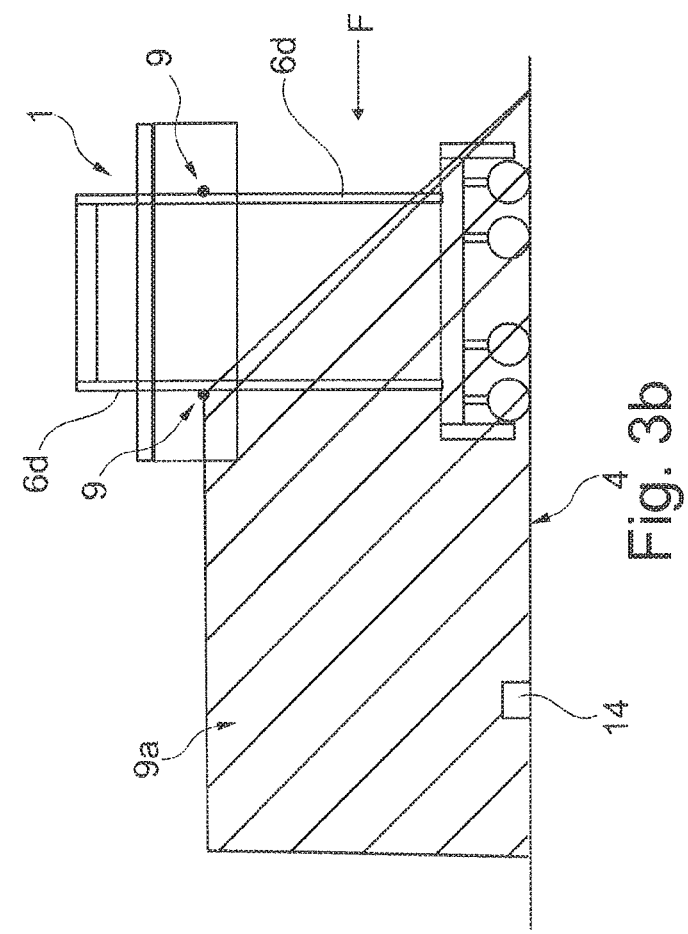

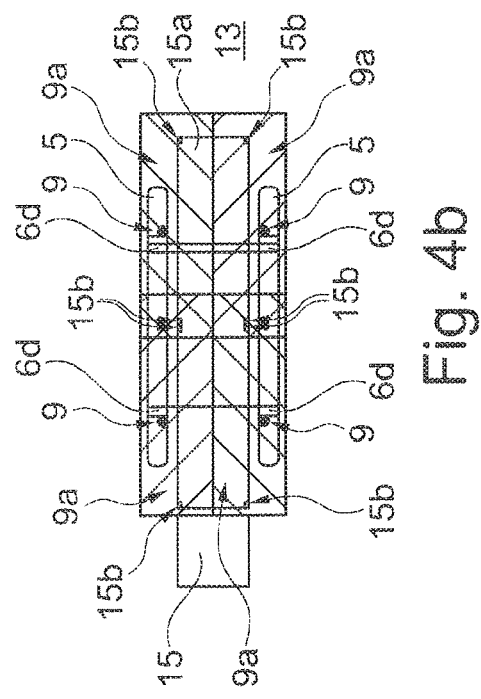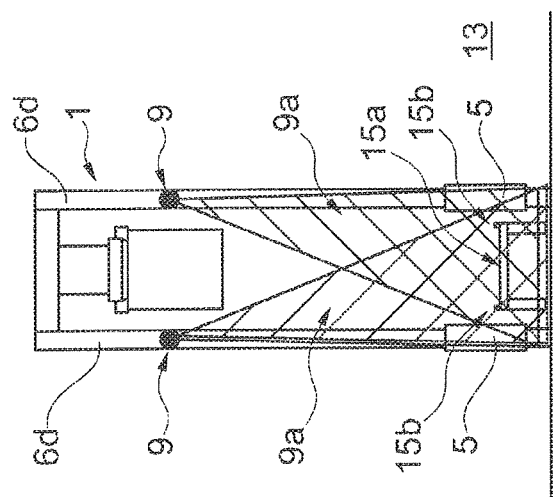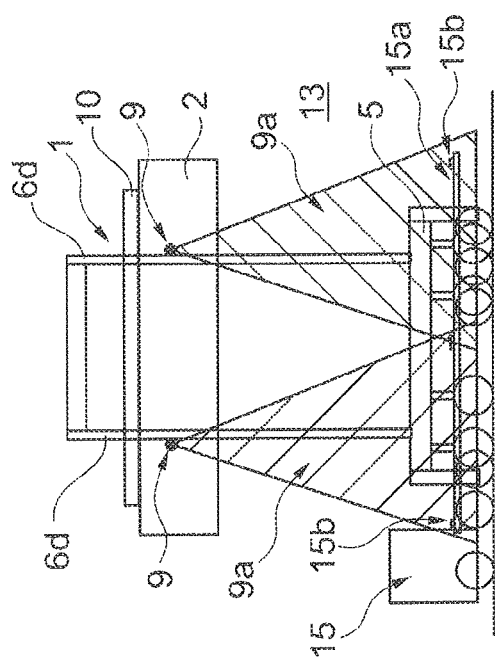

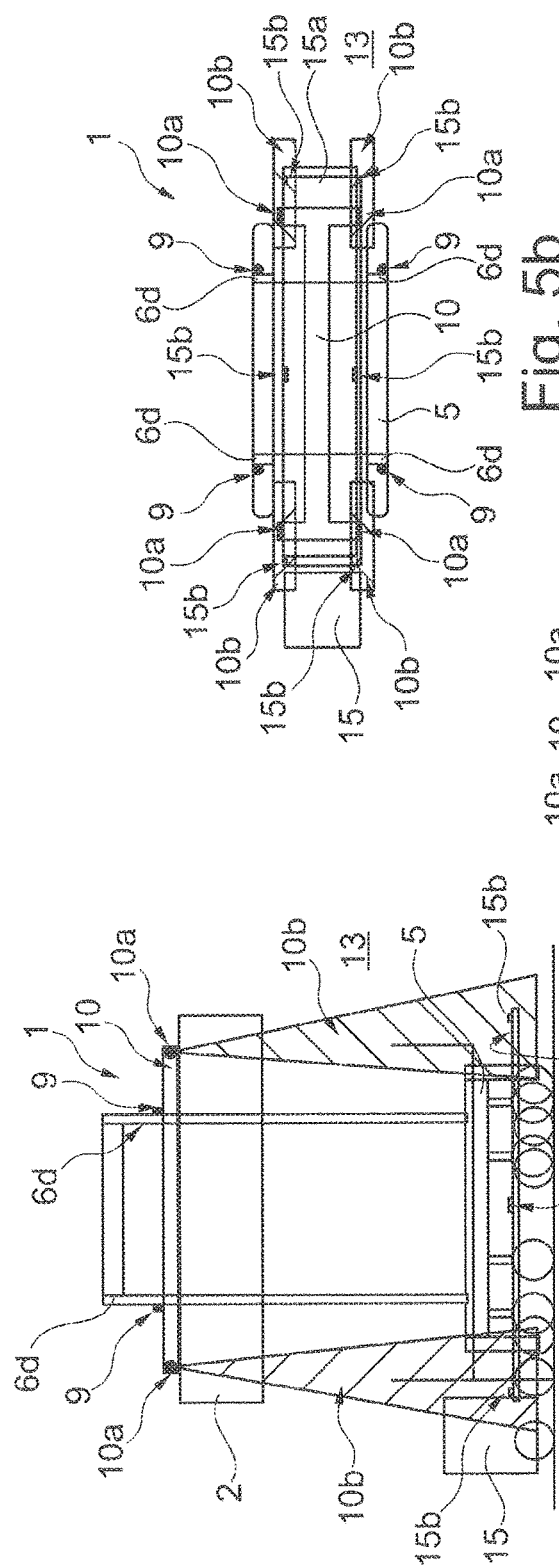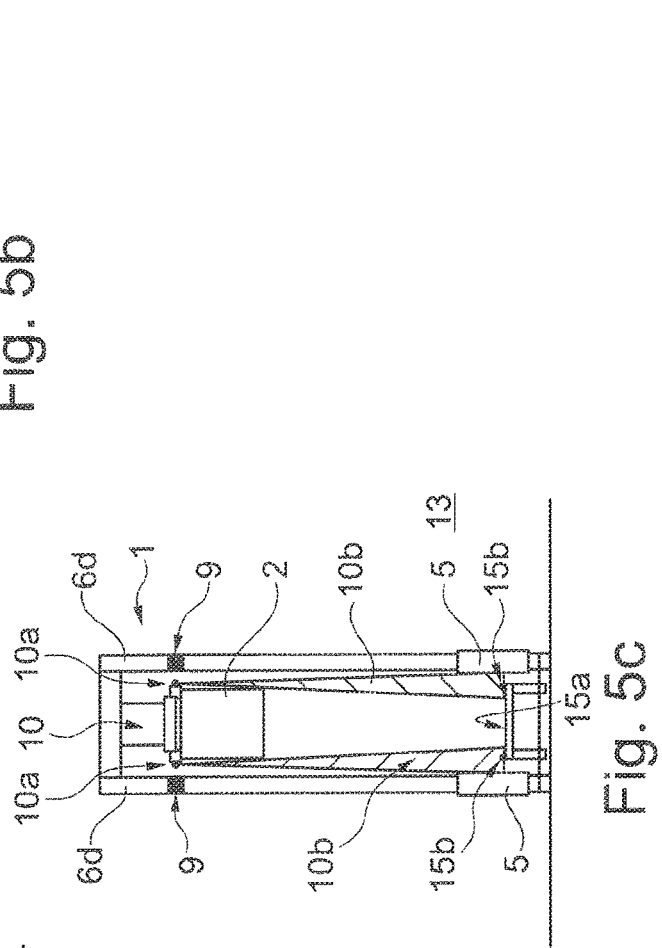

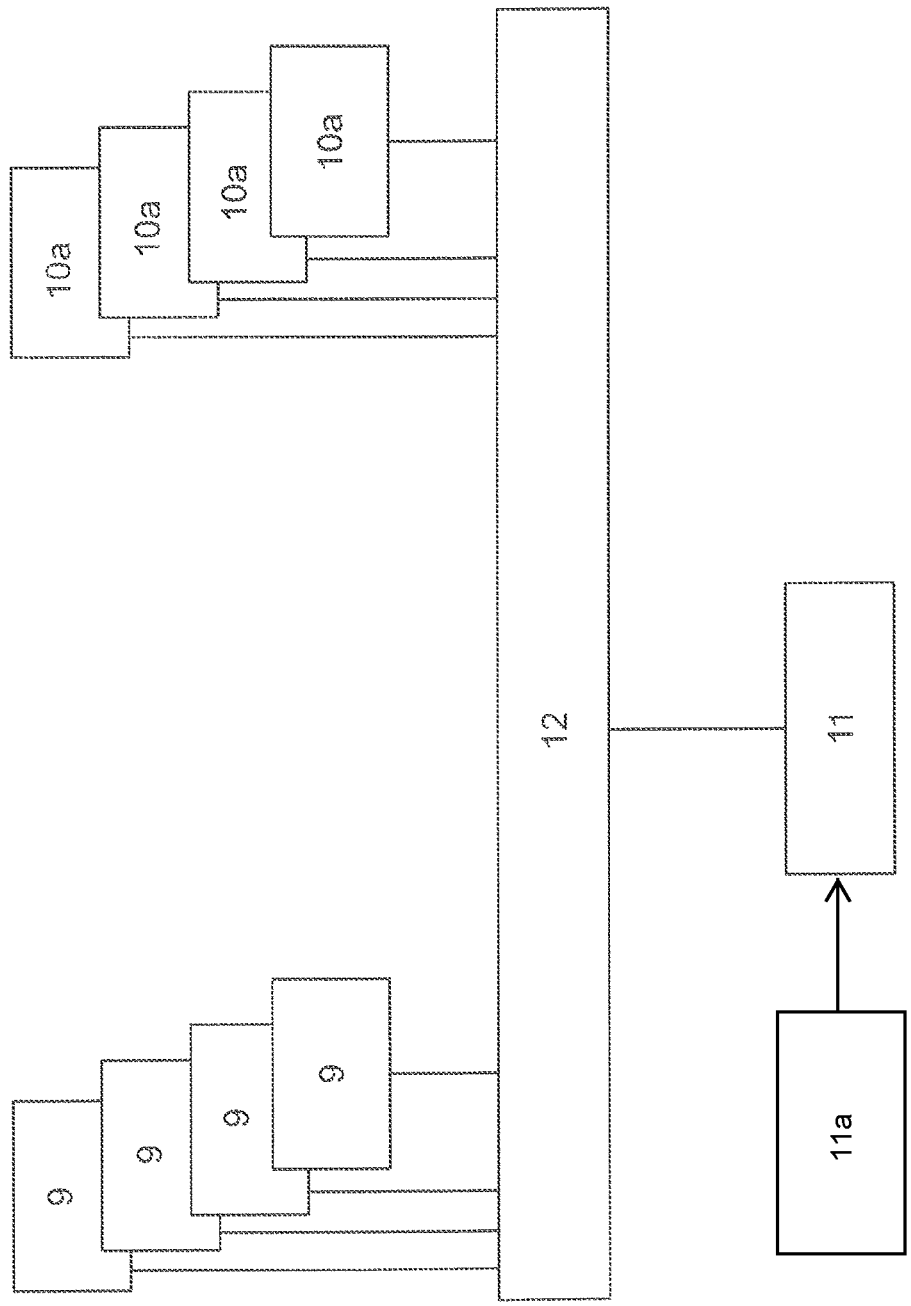

AUTOMATICALLY GUIDED LIFTING GANTRY DEVICE FOR CONTAINERS AND METHOD FOR OPERATING SUCH A LIFTING GANTRY DEVICE

CROSS REFERENCE TO RELATED APPLICATION

The present application claims the priority benefits of International Patent Application No. PCT/EP2018/064508, filed Jun. 1, 2018, and claims benefit of German patent application 10 2017 112 661.9, filed Jun. 8, 2017.

BACKGROUND AND FIELD OF THE INVENTION

The invention relates to a gantry lift device for containers, in particular in the manner of a straddle carrier or sprinter carrier, which comprises four mutually spaced apart gantry struts and can travel freely and in a floor-bound manner via its wheels, having a vehicle controller, via which the gantry lift device can be automatically controlled, and having a sensor system which is configured and designed to determine sensor data of a surrounding area of the gantry lift device in order to automatically control the gantry lift device.

The invention also relates to a method for operating such a gantry lift device.

Typical areas of usage for such gantry lift devices are the handling and transportation of containers, in particular normed ISO containers or standardised containers, within terminals in sea ports or inland ports or in terminals for combined road and rail traffic.

In this regard, ISO containers are understood to be normed large-volume or sea-freight containers which are used in the international transportation of goods. The most widely used are ISO containers with a width of 8 feet and a length of 20, 40 or 45 feet. Such containers have normed fittings which can be grasped by load picking-up means, referred to as spreaders or spreader frames, e.g. of a crane or of a gantry lift device. In particular, if the fittings of containers which are 20 feet long and 40 feet long are arranged on the container corners, these are also referred to as corner fittings or corner castings. There are also containers with a standardised length of 53 feet which previously were used as standardised, but not ISO-normed, containers exclusively in North America. The fittings of containers with lengths of 40 feet and 53 feet are not attached to the container corners but rather to the upper and lower sides in each case between the corners at a position which corresponds to the position of the corner fittings of ISO containers which are 40 feet long. There are also corresponding containers which are wider, which are also referred to as wide body containers.

Gantry lift devices are thus special heavy-duty vehicles which are also known as gantry lift trucks, gantry lift stackers, gantry stackers, gantry lift stacker trucks, gantry stacker trucks, straddle carriers, van carriers, shuttle carriers, sprinter carriers or runners. By means of their spider leg-like structure, which has four rigid gantry struts arranged in the corners of a notional rectangle, gantry lift devices can travel over a container resting on the ground or on another container or along the length of a container row and thus additionally also transport a raised container depending on the design. In dependence upon the construction height, the gantry lift devices are referred to e.g. as 1-over-3 devices, 1-over-2 devices etc. A straddle carrier formed as a 1-over-3 device can move with a picked-up container over three stacked containers without colliding with them, can set a container down onto three stacked containers or can pick up the uppermost of four stacked containers, and is approximately 15 m in height. 1-over-0 devices and 1-over-1 devices are also referred to as sprinter carriers and gantry lift devices with comparatively larger construction heights are referred to as straddle carriers. A load picking-up means referred to as a spreader or spreader frame can be lifted and lowered by means of its lifting device in order to grasp containers at their fittings and thus pick them up, lift them and place them down at a target location after transport. Provision can also be made that the load picking-up means is guided on the gantry struts during lifting/lowering.

Furthermore, the gantry lift devices can travel via wheels with a rubber tyre arrangement filled with air or gasses in the manner of tyres and can travel on the ground by means thereof but not in a rail-bound manner and therefore freely. Accordingly, the gantry lift devices in the present case are to be distinguished from rail vehicles and in particular railway wagons.

The gantry lift devices can be operated, i.e. controlled or guided, manually by the accompanying operator in the driver's cabin, in a semi-automated manner or—in the case of so-called automated guided vehicles (AGVs)—in a fully automated manner and therefore driverlessly. In this connection, "driverless" relates merely to the actual intervention of a driver in the control process. In this respect, driverless automated operation of a corresponding gantry lift device can also be achieved when there is an accompanying driver but one who does not actively intervene in the control process. In the case of semi-automated operation, the gantry lift device is generally controlled manually and, to relieve the operator, automated operation can be activated for individual functions, e.g. steering.

Semi-automated gantry lift devices of the type described above are already known from EP 2 060 472 B1. This document describes that a gantry lift device which can be controlled or guided manually by an accompanying operator can be provided at the front and rear with a 2D laser scanner on its running gear unit support. The 2D laser scanner is used to measure a distance to a container wall. Steering angle set values for automatic steering are calculated on the basis of the measured distance. Proceeding from manual operation, automatic steering can be activated in order to automatically steer the gantry lift device during travel along a container stack. Moreover, laser scanners can also be attached to the gantry struts.

Such gantry lift devices are also to be distinguished from container stacking cranes in which the horizontal crane girder spans two or more container rows. In order to pick up or set down containers from/in a container row, the lifting device of such stacking cranes is moved along the crane girder over the desired container row by means of a crane trolley and then the load picking-up means is lowered/lifted by means of the lifting device. In contrast to the situation in the above-mentioned gantry lift devices, the lifting device in corresponding stacking cranes is not stationary between the gantry struts in terms of its horizontal position but is movable via the crane trolley in the horizontal direction and thus in the horizontal direction relative to the gantry struts. A gantry lift device in terms of the present invention does not have a corresponding crane trolley. Also, the load picking-up means in stacking cranes is not guided on the gantry struts, unlike in gantry lift devices in terms of the present invention. Owing to the crane girders spanning two or more container rows or lanes for lorries or railway wagons, such stacking cranes have ample space available as a location for mounting sensor systems with laser scanners and/or camera-based image processing systems which permit automated operation of the stacking crane. Corresponding stacking cranes are known e.g. from EP 2 574 587 B1, EP 3 000 762 B1, EP 2 352 690 B1 and EP 1 490 286 B1.

EP 1 748 335 A2 describes a manual remote operating device for such a stacking crane. Two cameras are attached to one of the gantry struts of the stacking crane.

Sensor systems for stacking cranes are also disclosed in DE 10 2007 060 856 A1 and US 2015/0307330 A1.

The comparatively small amount of space available between the gantry struts and the load picking-up means moving at that location previously made automated operation difficult when using such sensor systems in gantry lift devices.

SUMMARY OF THE INVENTION

The present invention provides a gantry lift device having a sensor system, and a method for operating such a gantry lift device, which permit particularly safe and reliable automated operation of the gantry lift device.

A gantry lift device for containers, in particular in the manner of a straddle carrier or sprinter carrier, which comprises four mutually spaced apart gantry struts and can travel freely and in a floor-bound manner via its wheels, having a vehicle controller, via which the gantry lift device can be automatically controlled, and having a sensor system which is configured and designed to determine sensor data of a surrounding area of the gantry lift device in order to automatically control the gantry lift device, can be operated in a particularly safe and reliable manner in automated operation by virtue of the fact that the sensor system comprises at least two, preferably up to four, sensor units for contactless object measurement and in particular object recognition, of which one sensor unit is arranged on each one of the four gantry struts and is designed to determine sensor data of a surrounding area of the gantry lift device for object measurement and in particular object recognition. In the case of only two sensor units, these are preferably attached to two adjacent gantry struts, i.e. for example to the two left and right gantry struts above the respective running gear unit support or to the two front or rear gantry struts, in relation to the travel direction. Object measurement preferably also includes measuring the distance of the objects, measured in at least two dimensions, in relation to the gantry lift device. In a particularly advantageous manner, the redundant measurement and recognition of an object is possible from different viewing directions of at least two of the preferably four sensor units. As described in more detail below, a plausibility check can be carried out using the mutually independent, redundant sensor units and the sensor data determined therefrom as measuring results. This results in particularly trustworthy measuring results and thus allows particularly safe automated operation which is based at least partially on these sensor data or measuring results.

Such a sensor system thus permits particularly cost-effective, multi-functional usage which has previously not yet been achieved owing to the small space available and the poor visibility conditions resulting therefrom in conjunction with automated operation of gantry lift devices. In particular, such a sensor system can be used to measure and recognise, in a particularly reliable manner, containers which are normed or standardised in the above sense, in particular ISO containers, obstacles in the area of travel of the gantry lift device and loading and unloading positions of containers on loading surfaces of heavy-goods vehicles or their trailers. It is also possible to measure and recognise, in a particularly reliable manner, containers, container stacks and containers in load picking-up means of the gantry lift device in conjunction with the automated picking up and setting down of containers. Other possible fields of application will be explained with the aid of the description of the figures.

In a structurally simple manner, provision can be made that each of the sensor units comprises a 3D scanner, in particular a laser scanner, and/or a camera. This permits particularly detailed and thus precise and reliable measurement of the objects located in the fields of view of the sensor system.

Furthermore, the sensor units can advantageously each have a movable viewing direction, in particular a viewing direction which is movable in rotation and/or in translation. As a result, the fields of view of the sensor units can be adapted flexibly to the situation and in particular can be enlarged. In particular, the field of view of each sensor unit can be directed in a targeted manner into regions which, in the case of a fixed field of view, would be concealed e.g. by the gantry strut used to attach said sensor units.

In this regard, it is likewise advantageously possible to attach the sensor units in each case to the gantry lift device and in particular the respective gantry strut so as to be movable, in particular movable in rotation and/or in translation. For this purpose, corresponding guides and actuators can be provided for changing the position of the sensor units in a targeted manner. As a result, the sensor units can be moved along the respective gantry strut and/or about its longitudinal axis in order to adapt the field of view in a targeted manner.

According to one possible embodiment, provision can be made that the sensor system additionally comprises four spreader cameras, of which one spreader camera is arranged in each corner region of a spreader of the gantry lift device in order to determine sensor data of a surrounding area of the gantry lift device and in particular of the spreader for object measurement and in particular object recognition. The cameras of the sensor units and also the spreader cameras can be digital 2D or 3D and photo or video cameras and as such can be part of a camera-based image processing system for object measurement and in particular object recognition which is incorporated into the sensor system of the gantry lift device. Any cameras of the sensor units and/or spreader cameras can operate, within the scope of the camera-based image processing, in particular according to the principle of the so-called stereo vision or 3D vision in order to determine, from the sensor data of the individual sensor units, three-dimensional sensor data of the desired surrounding area of the gantry lift device and the objects located therein.

In a particularly advantageous manner, provision can additionally be made that the sensor system comprises an automatic calibration device, by means of which the sensor units and any spreader cameras can be automatically calibrated to reference objects with known shapes, patterns or contours and dimensions. Reference objects include permanently present structures of the gantry lift device, e.g. the gantry struts or running gear unit supports, and—alternatively or additionally—marking elements which are attached to the gantry lift device for this purpose. The reference objects are preferably arranged such that they lie in the field of view of several or all sensor units or spreader cameras. In the case of marking elements, these are preferably attached, for this purpose, to the vehicle support or its upper side facing in the direction of the sensor units. Such an automatic calibration device permits particularly time-saving calibration of the sensor system, and so the downtime of gantry lift devices caused thereby can be minimised. This applies in particular when gantry lift devices are retrofitted with a sensor system in accordance with the invention and for this purpose are taken out of continuous operation of a terminal for handling containers.

Provision can also be made that the sensor system includes a computer connected to the sensor units and the vehicle controller, in order to evaluate sensor data determined by the sensor system and to perform object recognition on the basis of the determined sensor data and to automatically control the gantry lift device on the basis of the evaluation result.

A method for operating a gantry lift device for containers, in particular in the manner of a straddle carrier or sprinter carrier, which comprises four mutually spaced apart gantry struts and can travel freely and in a floor-bound manner via its wheels, having a vehicle controller, via which the gantry lift device can be automatically controlled, and having a sensor system which is configured and designed to determine sensor data of a surrounding area of the gantry lift device in order to automatically control the gantry lift device, can be improved for particularly safe and reliable automated operation of the gantry lift device by virtue of the fact that the sensor system comprises at least two, preferably up to four, sensor units for contactless object measurement and in particular object recognition, of which one sensor unit is arranged on each one of the four gantry struts and determines sensor data of a surrounding area of the gantry lift device for object measurement and in particular object recognition. Preferably, the at least two sensor units perform redundant measurement and recognition of an object from different viewing directions which was explained in more detail above in relation to the gantry lift device in accordance with the invention and will be explained in more detail below with the aid of the description of the figures. For the structural details of the sensor system, within the scope of the method in accordance with the invention the variants described above in relation to the gantry lift device in accordance with the invention and described below with the aid of the description of the figures are feasible.

In addition, provision can advantageously be made that, when determining the sensor data for object measurement and in particular object recognition, viewing directions of the sensor units and any spreader cameras of the sensor system are moved. This can include movement of the sensor units or spreader cameras themselves. The movements of the fields of view and/or the respective sensor units can be performed in rotation and/or in translation in order to detect and measure in particular an object from different viewing angles. As a result, the respective fields of view can be flexibly adapted to the situation and can be enlarged and in each case directed towards the same object. Therefore, it is possible that, in particular in conjunction with the redundant measuring and recognising of an object, individual fields of view can at least partially coincide and intersect or overlap one another in a targeted manner (see e.g. FIGS. 4a to 4c).

The sensor system can also comprise an automatic calibration device, by means of which the sensor units and any spreader cameras can be automatically calibrated, as already mentioned above, to reference objects, in particular to permanently present structures of the gantry lift device or to marking elements which are attached to the gantry lift device.

Furthermore, the determined sensor data can be evaluated, object recognition can be performed on the basis of the determined sensor data and the gantry lift device can be automatically controlled on the basis of the evaluation result.

Further advantageous embodiments and details of the invention will be apparent from the following description.

BRIEF DESCRIPTION OF THE DRAWINGS

FIGS. 1a to 1c show three views of a gantry lift device when approaching a container store of a terminal for handling containers;

FIGS. 2a to 2c show three views of the gantry lift device when travelling in the container store of FIGS. 1a to 1c;

FIGS. 3a to 3c show three views of the gantry lift device when travelling in the terminal outside the container store;

FIGS. 4a to 4c show three views of the gantry lift device when setting down a container on the loading surface of a heavy-goods vehicle;

FIGS. 5a to 5c show three views of the gantry lift device in an alternative embodiment when setting down a container on the loading surface of a heavy-goods vehicle; and FIG. 6 shows a schematic view of a system for automatically controlling the gantry lift device.

DESCRIPTION OF THE PREFERRED EMBODIMENTS

FIGS. 1a to 1c show an automated guided gantry lift device 1 when approaching a container store 2c of a terminal for handling containers 2 in a plan view (FIG. 1a) and two side views thereof with a horizontal viewing direction (FIGS. 1b and 1c). The gantry lift device 1 is a heavy-duty vehicle having a lifting device, configured as a gantry lift apparatus, for lifting and lowering containers 2, in particular in the form of standardised or normed containers such as e.g. ISO containers in the sense defined in the introductory part, which typically comprise normed fittings and in particular corner fittings.

The gantry lift device 1 can travel freely in a floor-bound manner on a ground surface 4 via a total of eight rubber-tired wheels 3. It is fundamentally also possible to provide more or less than eight wheels 3 correspondingly provided with tyres if this is technically necessary or possible. The wheels 3 of the gantry lift device 1 are fastened to two running gear unit supports 5 which are each oriented with their longitudinal extension in, or parallel to, the travel direction F of the gantry lift device 1. The two running gear unit supports 5 each include four of the wheels 3 which are spaced apart behind one another as seen in the direction of the longitudinal extension of the respective running gear unit support 5. The running gear unit supports 5 also have travel drives and steering motors for the wheels 3 which are powered by a drive unit of the gantry lift device 1. Depending on the drive technology used, which can be diesel-electric, diesel-hydraulic or fully electric, the drive unit comprises components such as e.g. a diesel engine and generator, batteries and/or hydraulic assemblies. By reason of the single-wheel steering provided it is possible to carry out different steering programs, such as e.g. optimised type curve travel, circular travel, rotation about its own vertical axis or backwards movement, by corresponding control.

The two running gear unit supports 5 arranged in parallel next to one another and spaced apart from one another are connected together via a front first gantry frame 6a and via a rear second gantry frame 6b. Accordingly, the two u-shaped gantry frames 6a, 6b are spaced apart from one another as seen in the travel direction F. Each of the two gantry frames 6a, 6b comprises an upper horizontal gantry support 6c oriented transversely to the travel direction F, the lateral ends of which are adjoined in each case by a gantry strut 6d extending vertically and in a straight line downwards in the direction of the ground surface 4. By means of this structure, the rigid gantry struts 6d, as seen in plan view, are arranged in the corners of a notional quadrilateral, preferably a rectangle. By means of the total of four gantry struts 6d the two gantry frames 6a, 6b are supported on the running gear unit supports 5, whereby a spider leg-like structure is produced. The two gantry struts 6d of each gantry frame 6a, 6b and correspondingly also the two running gear unit supports 5 are spaced apart from one another at least by the width of an ISO container. However, the spacing between the running gear unit supports 5 is smaller than the overall width of two ISO containers located with their longitudinal sides next to one another, and so the gantry lift device cannot move over two ISO containers located next to one another accordingly, unlike a container stacking crane. Furthermore, the two gantry frames 6a, 6b are connected to one another via two mutually spaced apart longitudinal supports 7 oriented in the travel direction F. The two gantry supports 6c and the longitudinal supports 7 form a rectangular top frame 8 which connects the four gantry struts 6d together at their upper end and is supported by the gantry struts 6d. One of the gantry struts 6d is attached in each corner of the top frame 8.

Moreover, the gantry lift device 1 includes a machine platform 8a arranged between the gantry struts 6d in the region of the top frame 8, which platform is preferably formed as a frame-like steel structure. As seen in plan view, the machine platform 8a is formed substantially as a rectangle corresponding to the base surface of the support structure defined by the gantry struts 6d and is fitted-in between the gantry struts 6d. At least the drive unit is arranged on the machine platform 8a. Therefore, the machine platform 8a serves as a support structure for housing above-mentioned components of the drive unit. In addition, control cabinets, braking resistors and further drive components of the gantry lift device 1 can be arranged on the machine platform 8a.

The lifting device of the gantry lift device 1 is formed in the manner of a hoist, e.g. as a cable pull device comprising one or more steel cables 1a (see e.g. FIG. 1c). A load picking-up means can be lifted in a substantially vertical lifting direction H and lowered in the direction opposite the lifting direction H via the motorised and preferably electric motor-driven lifting device for picking up and handling the containers 2 beneath the machine platform 8a and between the gantry struts 6d. For this purpose, the cable pull device is connected to the load picking-up means via its cables 1a, wherein the cables 1a can be passed over deflecting rollers fastened to the load picking-up means so that two cable strands per deflecting roller run off in the direction of the top frame 8. In order to be able to raise or lower the load picking-up means, the cables can be wound onto a common cable drum or a plurality of separate cable drums, or can be unwound therefrom. The cable drums can be driven via the drive unit or a dedicated motorised lifting drive separate therefrom. If each cable is passed over a deflecting roller, fastened to the load picking-up means, in the sense of a free cable roller, each cable is reeved at least once, whereby a type of pulley block is formed and the load engaging on each cable is divided onto the cable strands of the corresponding cable. Multiple reeving with a correspondingly larger number of cable rollers is also feasible. The lifting device is additionally arranged in a stationary manner in relation to its horizontal position between the gantry struts 6d, and so owing to the lack of a crane trolley the lifting device and the load picking-up means alone have to be positioned by suitably manoeuvring the gantry lift device 1 above the desired container row or the desired loading or unloading position above the loading surface 15a of a heavy-goods vehicle 15 (see FIGS. 4a to 4c and 5a to 5c) in order to pick up or place a container 2 at that location. The lifting device or at least parts thereof, e.g. cable drums or any dedicated lifting drive, can be arranged on the machine platform 8a. However, alternatively, the cable drums can also be arranged on the running gear unit supports 5 between the two gantry frames 6a, 6b.

The load picking-up means is formed as a spreader 10 which can be in particular a so-called single-lift or twin-lift spreader. In the twin-lift variation, two containers 2a, which are each 20 feet long and are arranged immediately behind one another in the longitudinal orientation as seen in the travel direction F of the gantry lift device 1, can be picked up. In order to pick up a container 2, so-called twist locks of the spreader 10 engage into corresponding upper fittings or corner fittings of the containers 2 formed e.g. as ISO containers, the subsequent locking thereof fastening the container 2 to the spreader 10. In a conventional manner, the load picking-up means is able to move up and down in the lifting direction H and in the direction opposite the lifting direction H below the top frame 8 and between the gantry struts 6d of the front first gantry frame 6a and the gantry struts 6d of the rear second gantry frame 6b and can be guided on the gantry struts 6d. The spreader 10 can be telescopic and thus have a variable length and/or width in order to be able to pick up containers 2 with different lengths and/or widths, e.g. containers 2a with a length of 20 feet or containers 2b with a length of 40 or 45 feet. Actuation of the lifting device and the spreader 10 including any telescopic functions thereof likewise occurs automatically via the vehicle controller 11.

The spreader 10 extends with its longitudinal support in the travel direction F between the gantry struts 6d. Furthermore, the spreader 10 comprises two transverse supports which each extend between the gantry struts 6d of the two gantry frames 6a and 6b and therefore transversely to the travel direction F at the opposite ends of the longitudinal support. Furthermore, deflecting rollers can be fastened to each of the two transverse supports in order thereby to fasten and suspend the spreader 10 on the cables 1a of the cable pull device.

The gantry lift device 1 is typically moved between the container store 2c of the terminal and a handling area 13 (see FIGS. 4a to 4c and FIGS. 5a to 5c) of the terminal in order to pick up or release containers 2 in the handling area 13 or to place containers into, or remove containers from, the container store 2c. Depending upon the type of terminal, the containers 2 can be placed or picked up in the handling area 13 by a crane, e.g. a Ship to Shore crane—STS crane for short—for emptying or loading ships, or the containers can be delivered or collected by a heavy-goods vehicle 15 for transport on public roads. Accordingly, the gantry lift device 1 picks up the containers 2 from the ground surface 4 or the container stack at that location or the loading surface 15a of the heavy-goods vehicle 15a or places the containers down at the respective location, in that it moves over the corresponding utility space or the container stack on the ground surface 4 or the corresponding loading surface 15a and the lifting device and the spreader 10 or its twist locks are actuated.

Since the gantry lift device 1 can be operated in a fully automated manner as an AGV in the manner described in the introductory part, the gantry lift device 1 comprises a corresponding vehicle controller 11 (see FIG. 6). The vehicle controller 11 can be used to automatically control all the manoeuvres of the gantry lift device 1 in automated operation, in that transport orders which are planned e.g. via a superordinate computer-assisted management system are performed and routes which are specified in this respect are converted by control technology into corresponding manoeuvres within the terminal for handling containers 2. Converting into manoeuvres includes generating the specifications required for this purpose in the form of desired values for actuating the travel drives and/or actuating the steering or steering motors and/or actuating the lifting device including the spreader 10 of the respective gantry lift device 1. In this regard, the vehicle controller 11 is used to thus automatically control steering operations and speeds and accelerations and decelerations of all drives, optionally by way of a braking operation, of the gantry lift device 1.

The routes which are specified for completing transport orders and are thus to be travelled are generated in the sense of desired routes by means of the management system and are transmitted to the gantry lift devices 1 or their vehicle controller 11 via wireless communication connections, e.g. in the form of WLAN connections. The desired routes can consist of a plurality of individual sections each having a start point and a target point. Desired routes can also be specified and changed in this case via the management system and the communication connections, e.g. by means of target positions specified for specific points in time, lanes to be used and/or travel directions. Moreover, the management system can adapt dynamic traffic rules and block or release areas, in particular individual lanes, in the sense of exclusion areas, and can thus ensure that only one gantry lift device 1 is located in a specified area.

In addition to planning transport orders, route planning and route monitoring also take place via the management system. In order to be able to actuate the travel drives, the steering motors and the lifting device or the spreader 10 in a targeted manner for this purpose within automated operation of the gantry lift devices 1, continuous processing of actual values of the positions and orientation or alignments, which vary over time, of the gantry lift devices 1 located in the terminal and further operating information such as e.g. the respectively used travel areas, lanes and travel directions of the gantry lift devices 1 and travel speeds and traffic rules, is also performed. The corresponding actual values are fed back to the management system and/or the vehicle controller 11 in this regard. For this purpose, locating systems on the basis of transponder technology, GPS or D-GPS/Long Position Radar—LPR for short—can be used.

In the container store 2c of the terminal, the containers 2 can be stacked in several mutually spaced apart and parallel container rows. By way of example, FIG. 1a shows three container rows of the container store 2c. Within a container row, the containers 2, 2a, 2b are placed with their respective narrow sides adjoining one another, and so the longitudinal sides of the containers 2, 2a, 2b are flush with one another within a certain tolerance range. Two adjacent container rows are spaced apart from each other by an aisle at least at a distance such that the gantry lift device 1 with its running gear unit supports 5 and gantry struts 6d can travel in the aisle between the adjoining adjacent container rows without colliding with the containers, wherein the containers 2 of the container rows being travelled over are arranged between the running gear unit supports 5 and the gantry struts 6d of the two gantry frames 6a, 6b. The stock-keeping or management of the container store 2c can likewise be effected via the management system or its computer and can influence the planning or specification of the transport orders or routes.

In FIGS. 1a to 1c, the spreader 10 of the gantry lift device 1 with a picked-up container 2 is raised so high that the container 2 can be transported into the container store 2c by moving the gantry lift device 1 in the travel direction F and can be placed on the centre row of the three illustrated container rows. The gantry lift device 1 illustrated by way of example is thus formed as a so-called 1-over-3 device, and so the picked-up container 2 can be set down in the desired container row on a container stack consisting of three containers 2 (see also FIGS. 2a to 2c). Conversely, the uppermost container 2 of a container stack consisting of four containers can be picked up and set down on the ground surface 4, a container stack having fewer than four containers 2 or a loading surface 15a of a heavy-goods vehicle 15. The gantry lift device 1 can also have other construction heights and associated maximum lifting heights in the sense described in the introductory part and accordingly can be for example a 1-over-4 device or a 1-over-0 device.

In connection with the automatic control, the gantry lift device 1 illustrated in the figures is provided with a sensor system in accordance with the invention for contactless object measurement and in particular object recognition, which sensor system determines, and makes available, sensor data of a surrounding area of the gantry lift device 1 for automatically controlling the gantry lift device 1. The following items can be in particular measured and as a result recognised as objects: individual placed containers 2, container stacks, container rows with a plurality of individual placed containers 2 and/or a plurality of container stacks, aisles between said containers 2, container stacks and container rows, a container 2 connected to the load picking-up means or a chassis of a heavy-goods vehicle 15 or its loading surface 15a including the twist locks 15b arranged on the loading surface 15a for anchoring with the lower fittings or corner fittings of the container 2 to be placed on the loading surface 15a. Furthermore, the positions of said objects in a fixed coordinate system and/or relative to the respective gantry lift device 1 can be determined via distance measurement effected as part of the object measurement and from that in turn target positions for the gantry lift device 1 and in particular the spreader 10 can be determined.

Incorporating the sensor system thus permits particularly precise actuation of the gantry lift devices 1 in automated operation and in particular collision avoidance during travel through the terminal and when picking up and placing containers 2 in the container store 2c and in the transfer area 13.

The design and particularly advantageous usage scenarios of the sensor system will be explained hereinafter.

The sensor system preferably includes four sensor units 9 for contactless object measurement. Each one of the four sensor units 9 is arranged on one of the four gantry struts 6d and determines sensor data of a surrounding area of the gantry lift device 1 which is located in the field of view 9a, illustrated in each case as a hatched region, in terms of a detection region of the respective sensor unit 9. As a result, the objects located in the surrounding area or the field of view 9a can be measured and in particular recognised, i.e. identified. As a minimum, it is sufficient if at least two sensor units 9 are provided and each one of these is attached to one of two adjacent gantry struts 6d. Therefore, for example in relation to the travel direction F the two left gantry struts 6d above the left running gear unit support 5 or the two front gantry struts 6*d* can each be provided with a sensor unit 9. This also applies for all the exemplified embodiments described herein which are each provided with four sensor units 9 in terms of a preferred embodiment. In all the exemplified embodiments described herein, the sensor units 9 can each include e.g. a 3D scanner, in particular a laser scanner.

Alternatively or in addition, the sensor units 9 can also each include a camera which likewise determines sensor data of a surrounding area of the gantry lift device 1 and objects located therein for object measurement and subsequent object recognition, said objects being located in the field of view 9*a* of the sensor unit 9 or the camera thereof. If cameras are used, they are preferably digital photo or video cameras which determine 2D data as sensor data. However, 3D cameras can also be used.

The sensor units 9 of the sensor system are each arranged on the gantry struts 6*d* so high above the ground surface 4 that it is possible to obtain an overview of a container stack with a maximum height which the gantry lift device 1 can travel over without colliding with the containers. Therefore, in the present example, the sensor units 9 can be used to obtain an overview of a height corresponding to four stacked containers 2. The vertical mounting position of the sensor units 9 thus depends on the construction height of the gantry lift device 1. The fields of view 9*a* can also be oriented in a targeted manner at least partially past the container 2, picked up in the spreader 10, in the direction of the ground surface 4. Moreover, the sensor units 9 are each attached to the outer side of the corresponding gantry strut 6*d*, said side facing in the travel direction F and in the direction opposite the travel direction F. As a result, the gantry struts 6*d* of the left running gear unit support 5 are arranged between the associated sensor units 9. This applies accordingly for the gantry struts 6*d* of the right running gear unit support 5 and the sensor units 9 at that location.

In order to achieve a larger and in particular variable field of view 9*a* for the sensor units 9, the sensor units 9*a* each have a movable viewing direction, in particular a viewing direction which is movable in rotation and/or in translation. The sensor units 9*a* can also be attached to the gantry lift device 1 or the respective gantry strut 6*d* so as to be movable on the whole, in particular movable in rotation and/or in translation. As a result, the field of view 9*a* of the respective sensor unit 9*a* can be flexibly adapted and oriented and in particular the distance to an object surface to be scanned and measured can be reduced. In the case of laser scanners, the rotation or pivoting of the laser beams emitted for object measurement in the surrounding area of the gantry lift device 1 can be performed in particular about horizontal and/or vertical axes. The same applies analogously for any rotations or pivoting of any cameras of the sensor units 9. The viewing direction of the sensor units 9 can be adjusted in a targeted manner in this way such that the respective field of view 9*a* extends in the travel direction F and/or in the direction opposite the travel direction F and transverse to the travel direction F and also downwards in the direction of the ground surface 4 and as far as the ground surface 4. The field of view 9*a* of the sensor units 9 can thus also include the running gear unit supports 5 and the part of the gantry struts 6*d* arranged beneath the sensor units 9. In this regard, different fields of view 9*a* are schematically illustrated in the figures. FIG. 1*a* illustrates the fields of view 9*a* of the two sensor units 9 which are at the front in relation to the travel direction F. The fields of view 9*a* are oriented in the direction of the aisles of the container store 2*c*. As illustrated in FIG. 1*b*, these fields of view 9*a* can also be directed from their mounting position in the direction opposite the travel direction F and can extend past the respective gantry strut 6*d* on the inside and/or outside. This also applies for the fields of view 9*a* illustrated in the other figures, in particular in FIG. 4*b*.

The sensor system also includes a computer 12 connected to the sensor units 9 and the vehicle controller 11 in a signal-transmitting manner (see FIG. 6) in order to evaluate the sensor data determined by the sensor system and to perform object recognition on the basis of the determined sensor data. The computer 12 and/or the vehicle controller 11 can be part of a safety controller which is also referred to as SPS or PLC (Programmable Logic Controller) or Failsafe PLC or F-PLC. The gantry lift device 1 is then automatically controlled on the basis of the evaluation result. For this purpose, the sensor system of each gantry lift device 1 can also communicate with the superordinate management system via the computer 12 and/or the vehicle controller 11 and can thereby use the above-mentioned wireless communication connections. In terms of evaluation and in particular object recognition, it is also possible to perform a comparison of the sensor data with known shapes, patterns and contours, which are e.g. stored in the computer 12 or the management system, of the above-mentioned objects and the corresponding object and its distance to the gantry lift device 1 can be recognised on the basis of the comparison. On the basis of the result of evaluating the sensor data, it is also possible to determine and, if need be, change target positions and associated desired routes for the gantry lift device 1 by the computer 12 and/or the management system and then to transmit same to the vehicle controller 11 in order for said vehicle controller to convert the routes by control technology into corresponding manoeuvres.

The gantry lift device 1 can use a corresponding sensor system, as illustrated in FIGS. 1*a* to 1*c*, to protect against collisions in the container store 2*c*. The sensor system can be used to recognise when individual containers 2 of a container stack or a container stack on the whole extend beyond the tolerance range of the respective container row, thus risking a collision between the gantry lift device 1 and the container 2 or container stack in an aisle of the container store 2*c* in which the gantry lift device 1 is travelling or is intended to travel. In this regard, the aisles and adjoining containers 2 in the fields of view 9*a* are measured using the sensor data determined by the sensor system. Measuring is effected at least by the two sensor units 9, located at the front as seen in the travel direction F, of the sensor system or even by all four sensor units 9. Owing to the redundancy, the sensor data determined by at least two sensor units 9 and evaluation results can be combined and thereby checked for plausibility. By means of the computer 12 and/or the management system, a decision can be made in an automated manner as to whether the two aisles are wide enough for the currently valid specified target position along the original desired route to be reached without any collisions or whether this target position can be reached without any collisions via an amended desired route along newly specified intermediate positions through the same aisles. If this is not possible, stopping is triggered with corresponding feedback sent to the management system. For this purpose, the management system and/or the computer 12 connected thereto has the relevant dimensions of the respective gantry lift devices 1, in particular width dimensions of the running gear unit supports 5, and aisle widths, in particular the minimum distance between the containers 2 delimiting an aisle required to allow passage therethrough without any collisions, on the basis of which a comparison with the sensor data or the information obtained therefrom can then be made with regard to the measured and recognised objects and then said decisions can be made.

FIGS. 2a to 2c show the same three views of the container store 2c from FIGS. 1a to 1 c but for the case that the two aisles permit travel of the gantry lift device 1 to a temporary specified target position. The target position corresponds to a desired container stack in the centre container row, on which the picked-up container 2 should be placed. In this case, the sensor system is used likewise for protection against collisions and in particular for precisely positioning the gantry lift device 1 and the spreader 10 when setting down the container 2 on the container stack. For this purpose, the desired container stack and in particular the uppermost container 2 of this container stack is measured by means of the at least two sensor units 9 of the sensor system, in particular by means of all four sensor units 9. The length of the container 2 and also the positions of the fittings, in particular corner fittings, can be determined. On the basis of this object measurement and object recognition and distance measurement based thereon, the final target position of the gantry lift device 1 and the spreader 10 can be adapted, if required, with respect to the temporary target position by means of the computer 12 and/or the management system for setting down the container as precisely as possible, such that the container 2 is placed within the tolerance range. The lower fittings or corner fittings of the set down container 2 are arranged as flush as possible on the upper fittings or corner fittings of the container 2 located thereunder. In this regard, the fields of view 9a of all four sensor units 9a are schematically illustrated. As shown in FIG. 2b, the fields of view 9a of the two sensor units 9, which are allocated to the gantry struts 6d acting on the left running gear unit support 5 as seen in the travel direction F, also intersect one another. Accordingly, the fields of view 9a are oriented at least partially facing one another, i.e. to the rear or to the front. The side of the desired container stack facing the left running gear unit support 5 can thus be measured in a redundant and in particular mutually independent manner by the two left sensor units 9 illustrated in FIG. 2b, each with a different viewing angle. The results of the evaluation, taking place in the safety controller or the computer 12, of the object measurement performed by each sensor unit 9 are compared and are assumed to be correct only when the results are identical. The same applies for the two opposite right sensor units 9 and the right side of the container stack. This permits particularly safe object recognition and thus also particularly safe automated operation based thereon. A corresponding use of at least two sensor units 9 for redundant measurement and recognition of an object from different viewing directions is also possible for all other usage scenarios described in this application owing to the movable viewing directions or movable attachment of the sensor units 9 to the gantry struts 6d, in particular also with two front and/or rear sensor units 9.

A further option for using the sensor system for protection against collisions is illustrated in FIGS. 3a to 3c. In this case, in addition to said situation of the aisles in the container store 2c being too narrow, other obstacles 14 located in the travel area of the gantry lift device 1 can also be measured and recognised. The gantry lift device 1 is illustrated in FIG. 3a without a spreader 10. Measuring, including distance measuring, is effected at least by the two sensor units 9, located at the front as seen in the travel direction F, of the sensor system or even by all four sensor units 9. In the case of a recognised obstacle 14, this can be automatically circumnavigated or the gantry lift device 1 can be stopped in order to avoid a collision with the obstacle 14. As illustrated in FIGS. 3a to 3c, the obstacle 14 can be an object which is located inside or outside the container store 2c in the travel area and in particular on a desired route of the gantry lift device 1 specified by the management system, e.g. on the ground surface 4. In these cases, the obstacle 14 can be e.g. the delimitation of a lane or another object which unintentionally hinders or blocks the travel area. By means of the computer 12 and/or the management system, a decision can be made in an automated manner as to whether the obstacle 14 can be circumnavigated without any collisions via an amended desired route along newly specified intermediate positions and in particular without hindering other gantry lift devices 1 and desired routes thereof. If not, stopping is triggered with corresponding feedback sent to the management system, in the same way as in the above situation of the aisles of the container store 2c being too narrow. For this purpose, the management system and/or the computer 12 connected thereto has the dimensions of the respective gantry lift devices 1, on the basis of which a comparison can then be made with the sensor data or the information obtained therefrom with regard to the measured and recognised objects and then a decision can be made as to whether the gantry lift device 1 can continue to move along the original or an amended desired route without any collisions.

The unloading of a gantry lift device 1, illustrated in FIGS. 4a to 4c, by setting down the container 2, picked up by the gantry lift device 1 or its spreader 10, onto the loading surface 15a of a heavy-goods vehicle 15 can be performed using the sensor system. For this purpose, the gantry lift device 1 travels with the container 2 into a specified temporary target position. The target position is allocated to a transfer location in the handling area 13 and is selected such that the loading surface 15a of a heavy-goods vehicle 15 manoeuvred to the transfer location is located between the running gear unit supports 5 and the container 2 is located above the loading surface 15a. The loading surface 15a is typically arranged on a trailer of the heavy-goods vehicle 15 and is provided with twist locks 15b. In this case, the sensor system is used likewise for protection against collisions and in particular for precisely positioning the gantry lift device 1 and the spreader 10 when setting down the container 2 on the loading surface 15a and the twist locks 15b at that location. In this regard, order data for the measurement and precise positioning to be carried out can also be specified to the computer 12 by the management system. Possible order data can include the information that the desired placing position is at the front or rear of the loading surface 15a, in particular if the container is a container 2a with a length of 20 feet and two containers 2a can be placed on the loading surface 15a. The sensor system is then used to measure the loading surface 15a and the twist locks 15b by means of the at least two sensor units 9, in particular by means of all four sensor units 9. Measuring can also be effected in a redundant manner in the above sense, in that at least individual twist locks 15b are detected and measured in a targeted manner by at least two overlapping fields of view 9a of the at least two sensor units 9 (see in particular FIG. 4b). The viewing directions or fields of view 9a of the respective sensor units 9 can be displaced and adapted in a corresponding manner for this purpose. The length of the loading surface 15a and also the positions of the twist locks 15b can be determined, taking into account any order data. On the basis of this object measurement and thereby effected distance measurement, the target position of the gantry lift device 1 and the spreader 10 can be adapted, if need be, by means of the computer 12 and/or the management system for setting down the container as precisely as possible, and so the container 2 or its fittings can be locked, after the container 2 is set down on the loading surface 15a, by means of the twist locks 15b, which then engage into the fittings, on the loading surface 15a. Therefore, loading and unloading positions of containers 2 on the loading surfaces 15a can be recognised and automatically aimed for.

FIGS. 5a to 5c illustrate an alternative embodiment of the sensor system in conjunction with setting down a container 2 on the loading surface 15a of a heavy-goods vehicle 15. The sensor system includes, in addition to the sensor units 9 attached to the four gantry struts 6d and their optional cameras, four spreader cameras 10a. The spreader cameras 10a are fastened to the spreader 10 and can be lifted or lowered together with the spreader in the lifting direction H or in the direction opposite the lifting direction H. Each one of these spreader cameras 10a is arranged on a corner region of the spreader 10 in order to determine sensor data of a surrounding area of the gantry lift device 1 and in particular of the spreader 10. Each corner region of the spreader 10 is allocated an upper container corner of a container 2 which is to be picked up or is already picked up. If the spreader 10 is telescopic, then the spreader cameras 10a can thus also be displaced in relation to their horizontal position in association with the telescoping of the spreader 10. As is the case for the optional cameras of the sensor units 9, the spreader cameras 10a are preferably digital photo or video cameras which determine 2D data as sensor data. However, 3D cameras can also be used.

The spreader cameras 10a are likewise connected to the computer 12 in a signal-transmitting manner (see FIG. 6). Owing to the spreader cameras 10a which are provided in addition to the at least two, preferably four, sensor units 9, a combined or linked object measurement and object recognition can be effected. The sensor units 9 and in particular their 3D scanners and/or cameras can then be used to measure and recognise the objects located in the fields of view 9a, including the spreader 10 at that location with or without a container 2, whilst the spreader cameras 10 arranged on the spreader 10 can be used to observe the surrounding area beneath the spreader 10 within their fields of view 10b illustrated as a hatched region and to measure and recognise objects located therein. The same objects can also be measured and recognised by means of the sensor units 9 as well as by means of the spreader cameras 10a, i.e. in a redundant manner. The respective evaluation results can thus be checked for plausibility and as a result can permit particularly safe automated operation as a combined evaluation result. In the same manner as the above-described fields of view 9a, the fields of view 10b can be oriented in a targeted manner at least partially past the container 2, picked up in the spreader 10, in the direction of the ground surface 4 and is also movable accordingly for this purpose. As a result, object measurement and object recognition are also possible in areas which are concealed e.g. by the spreader 10 and/or the container 2 fastened thereto and thus cannot be detected by the fields of view 9a of the sensor units 9. For the remainder, object measurement and object recognition are effected in this embodiment in an analogous manner to the above embodiments.

The alternative embodiment can also be used in the above-described usage scenarios of FIGS. 1a to 1c, 2a to 2c and 3a to 3c for object measurement and in particular object recognition.

The sensor system schematically illustrated in FIG. 6 for automatically controlling the respective gantry lift device 1 is thus also used in the above-described cases or usage scenarios, said sensor system comprising the computer 12 which is connected to the at least two, in the present case four, sensor units 9 of the sensor system and the vehicle controller 11 of the gantry lift device 1. FIG. 6 also schematically illustrates the optional spreader cameras 10a which can be connected to the computer 12 in a signal-transmitting manner in parallel with the sensor units 9 in order to ensure that not only the sensor data of the sensor units 9 but also the sensor data of the spreader cameras 10a can be evaluated thereby for object recognition and automatic actuation of the respective gantry lift device 1 can be triggered via the vehicle controller 11 on the basis of the combined evaluation result.

The above-described functions of the sensor system for collision avoidance and precise positioning are also available during empty travel without a picked-up container 2 if a container 2 is to be collected from the container store 2c or the handling area 13 and is to picked up from the ground surface 4, a container stack or a loading surface 15a. The final target positions for the respective gantry lift device 1 and the spreader 10 can be determined in an analogous manner by means of the sensor system and, if required, can be changed from temporary target positions.

In each of the above-described variants, the sensor system moreover comprises an automatic calibration device, by means of which the sensor units 9 and the optionally provided spreader cameras 10a can be automatically calibrated to reference objects with known shapes, patterns or contours and dimensions. Reference objects include permanently present structures of the gantry lift device 1 and—alternatively or additionally—marking elements which are attached to the gantry lift device 1 for this purpose. The reference objects are preferably arranged such that they lie in the field of view 9a or 10b of several or all sensor units 9 or spreader cameras 10a. The marking elements can be attached to the gantry lift device 1 and in particular to the running gear unit supports 5 for this purpose, so that they lie in the respective field of view 9a or 10b. The marking elements can each be in the form of a cuboid, cube, pyramid or ring and can be produced from a material which can be easily detected by the sensor units 9 or spreader cameras 10a, such as e.g. sheet steel or synthetic material. The orders of magnitude of the marking elements are preferably greater than those of the twist locks.

The invention claimed is:

1. A gantry container lift comprising
four mutually spaced apart gantry struts;
wheels that enable the gantry container lift to travel freely and in a floor-bound manner;
a vehicle controller, via which the gantry container lift can be automatically controlled and can be operated in a fully automated manner as an automated guided vehicle, wherein in the automated operation all of the maneuvers of the gantry container lift can be automatically controlled, in that transport orders are executed and routes which are specified in this respect are converted by control technology into corresponding maneuvers within a terminal for handling containers; and
a sensor system which is configured and designed to determine sensor data of a surrounding area of the gantry container lift in order to automatically control the gantry container lift;
wherein the sensor system comprises at least two sensor units for contactless object measurement and object recognition, and wherein each sensor unit is arranged on a separate one of the four gantry struts and is designed to determine sensor data of a surrounding area of the gantry container lift for object measurement and object recognition, and wherein the sensor system additionally includes four spreader cameras, and wherein the sensor system includes an automatic calibration device via which the sensor units and spreader cameras can be automatically calibrated to reference objects comprising marking elements attached to the gantry container lift; and wherein transport orders are planned via a superordinate computer-assisted management system, and wherein the superordinate computer-assisted management system is operable to adapt dynamic traffic rules and block or release areas and ensure that only one gantry lift device is located in a specific area.

2. The gantry container lift as claimed in claim 1, wherein each of the sensor units comprises a 3D scanner.

3. The gantry container lift as claimed in claim 1, wherein the sensor units each have a movable viewing direction.

4. The gantry container lift as claimed in claim 3, wherein the movable viewing direction of each sensor unit is movable in rotation and/or in translation.

5. The gantry container lift as claimed in claim 1, wherein the sensor units are attached in each case to the respective gantry strut so as to be movable.

6. The gantry container lift as claimed in claim 5, wherein the sensor units are attached in each case to the respective gantry strut so as to be movable in rotation and/or in translation.

7. The gantry container lift as claimed in claim 1, wherein each spreader camera is arranged in a corner region of a spreader of the gantry container lift in order to determine sensor data of a surrounding area of the spreader.

8. The gantry container lift as claimed in claim 1, wherein the sensor system includes a computer connected to the sensor units and the vehicle controller, in order to evaluate sensor data of the sensor system and to perform object recognition on the basis of the determined sensor data and to automatically control the gantry container lift on the basis of the evaluation result.

9. The gantry container lift as claimed in claim 1, wherein the sensor system comprises four sensor units for contactless object measurement and object recognition with one of the sensor units arranged on each one of the four gantry struts.

10. The gantry container lift as claimed in claim 9, wherein each of the sensor units comprises a 3D laser scanner or a 3D camera.

11. The gantry container lift as claimed in claim 1, wherein the gantry container lift is configured as a straddle carrier or a sprinter carrier.

12. A method for operating a gantry container lift that has four mutually spaced apart gantry struts, wheels to enable the gantry container lift to travel freely in a floor-bound manner, and a vehicle controller, via which the gantry container lift is automatically controlled and is operated in a fully automated manner as an automated guided vehicle, wherein in the automated operation all of the maneuvers of the gantry container lift can be automatically controlled, in that transport orders are executed and routes which are specified in this respect are converted by control technology into corresponding maneuvers within a terminal for handling containers, said method comprising:

determining sensor data of a surrounding area of the gantry container lift for object measurement and object recognition via a sensor system of the gantry container lift, wherein the sensor system comprises at least two sensor units for contactless object measurement and object recognition, wherein each sensor unit is arranged on a separate one of the four gantry struts and determines sensor data of a surrounding area of the gantry container lift for object measurement and object recognition, and wherein the sensor system additionally includes four spreader cameras, and wherein the sensor system includes an automatic calibration device via which the sensor units and spreader cameras are automatically calibrated to marking elements which are attached to the gantry container lift; and automatically controlling the gantry container lift via the vehicle controller based on said determining sensor data of the surrounding area of the gantry container lift to execute transport orders planned via a superordinate computer-assisted management system, and wherein the superordinate computer-assisted management system can adapt dynamic traffic rules and block or release areas and ensure that only one gantry lift device is located in a specified area.

13. The method as claimed in claim 12, further comprising moving viewing directions of the sensor units of the sensor system during said determining sensor data of the surrounding area of the gantry container lift.

14. The method as claimed in claim 12, wherein the determined sensor data are evaluated and object recognition is performed on the basis of the determined sensor data and the gantry container lift is automatically controlled on the basis of the evaluation result.

15. The gantry container lift as claimed in claim 12, wherein the gantry container lift is configured as a straddle carrier or a sprinter carrier.

16. The gantry container lift as claimed in claim 12, wherein the sensor system comprises four sensor units for contactless object measurement and object recognition with one of the sensor units arranged on each one of the four gantry struts.

17. A gantry container lift comprising
four mutually spaced apart gantry struts;
wheels that enable the gantry container lift to travel freely and in a floor-bound manner;
a vehicle controller, via which the gantry container lift can be automatically controlled and can be operated in a fully automated manner as an automated guided vehicle, wherein in the automated operation all of the maneuvers of the gantry container lift can be automatically controlled, in that transport orders are executed and routes which are specified in this respect are converted by control technology into corresponding maneuvers within a terminal for handling containers; and
a sensor system which is configured and designed to determine sensor data of a surrounding area of the gantry container lift in order to automatically control the gantry container lift;
wherein the sensor system comprises four sensor units for contactless object measurement and object recognition, and wherein a respective one of the sensor units is arranged on each one of the four gantry struts and is designed to determine sensor data of a surrounding area of the gantry container lift for object measurement and object recognition, and wherein the sensor system additionally includes four spreader cameras, and wherein the sensor system includes an automatic calibration device via which the sensor units and spreader cameras can be automatically calibrated to reference objects comprising marking elements attached to the gantry container lift, and wherein the sensor units are attached in each case to the respective gantry strut so as to be movable; and wherein transport orders and respective routes are planned via a superordinate computer-assisted management system, and wherein the superordinate computer-assisted management system is operable to adapt dynamic traffic rules and block or release areas and ensure that only one gantry lift device is located in a specific area.

18. The gantry container lift as claimed in claim 17, wherein each spreader camera is arranged in a corner region of a spreader of the gantry container lift in order to determine sensor data of a surrounding area of the spreader.

19. The gantry container lift as claimed in claim 17, wherein the gantry container lift is configured as a straddle carrier or a sprinter carrier.

* * * * *

UNITED STATES PATENT AND TRADEMARK OFFICE
CERTIFICATE OF CORRECTION

Page 1 of 1

PATENT NO. : 11,702,323 B2
APPLICATION NO. : 16/620147
DATED : July 18, 2023
INVENTOR(S) : Stefan Klement, Daniel Baselt and Sascha Pollak von Emohofen It is certified that error appears in the above-identified patent and that said Letters Patent is hereby corrected as shown below:

In the Specification

Column 9
Line 8, insert --11a-- after --system--

Column 12
Line 19, insert --11a-- after --tem--

Signed and Sealed this
Fifteenth Day of August, 2023

Katherine Kelly Vidal
*Director of the United States Patent and Trademark Office*